United States Patent [19]
Clausen

[11] Patent Number: 5,860,796
[45] Date of Patent: Jan. 19, 1999

[54] FUEL PUMP ASSEMBLY AND FILTER ELEMENT THEREFOR

[75] Inventor: Michael D. Clausen, Turlock, Calif.

[73] Assignee: Parker-Hannifin Corporation, Cleveland, Ohio

[21] Appl. No.: 693,574

[22] Filed: Aug. 7, 1996

[51] Int. Cl.⁶ .................................................. B01D 29/07
[52] U.S. Cl. .................................. 417/423.9; 417/423.3; 210/416.4; 210/493.1; 210/493.5
[58] Field of Search .............................. 417/423.9, 423.3; 210/416.4, 493.1, 493.5

[56] References Cited

U.S. PATENT DOCUMENTS

| | | | |
|---|---|---|---|
| 1,909,578 | 5/1933 | Franke | 417/61 |
| 3,254,769 | 6/1966 | McArthur | 210/194 |
| 4,581,135 | 4/1986 | Gerulis | 210/108 |
| 4,851,118 | 7/1989 | Kurihara | 210/315 |
| 5,190,651 | 3/1993 | Spencer et al. | 210/305 |
| 5,211,846 | 5/1993 | Kott et al. | 210/232 |
| 5,409,606 | 4/1995 | Spencer | 210/232 |
| 5,413,712 | 5/1995 | Gewiss et al. | 210/450 |
| 5,511,957 | 4/1996 | Tuckey et al. | 417/313 |
| 5,533,478 | 7/1996 | Robinson | 123/510 |
| 5,643,446 | 7/1997 | Clausen et al. | 210/184 |
| 5,674,393 | 10/1997 | Terhune et al. | 210/315 |
| 5,685,985 | 11/1997 | Brown et al. | 210/450 |
| 5,690,765 | 11/1997 | Stoyell et al. | 156/69 |
| 5,741,421 | 4/1998 | Erdmannsdoerfer et al. | 210/450 |

*Primary Examiner*—Timothy Thorpe
*Assistant Examiner*—Ehud Gartenberg
*Attorney, Agent, or Firm*—Christopher H. Hunter

[57] ABSTRACT

A fuel pump assembly includes a container with the removable cover which forms an enclosure for a pump and a replaceable filter element which is disposed in coaxial surrounding relation to the pump. The filter element includes an upper end cap having an end wall forming an annulus, and a downwardly-extending side wall which forms a central cavity. The lower end of the side wall includes a radially inwardly-directed flange which defines an annular opening. A ring seal is disposed within this lower annular opening in the side wall. The filter element also includes a lower end cap which has an annular spacer collar with axially-upwardly extending tabs. A tubular filter media is disposed between the upper and lower end caps and secured thereto with a potting compound. Side wall 82 extends downwardly through the center of the filter media such that the tabs on the spacer collar on the lower end cap contact the ring seal on the upper end cap. The pump is inserted within the cavity defined by the side wall on the upper end cap such that the ring seal seals against the lower end of the pump around the pump inlet. Fuel flows radially inward and then axially downward through the filter media, radially inward and then axially upward through flow paths between the tabs on the spacer collar on the lower end cap and the ring seal, and then axially upward to the pump inlet. Outwardly-projecting ridges or spacers are provided around the circumference of the upper and lower end caps, and axially downwardly-extending fins are provided on the lower end cap, to provide an offset between the filter element and the container for fuel flow therebetween.

26 Claims, 4 Drawing Sheets

FUEL PUMP ASSEMBLY AND FILTER ELEMENT THEREFOR

FIELD OF THE INVENTION

The present invention relates generally to fuel pump assemblies, and more particularly to a replaceable filter element for a fuel pump in the assembly.

BACKGROUND OF THE INVENTION

Various devices are known for supplying fuel from a tank to an internal combustion engine of a motor vehicle. Laue, et al., U.S. Pat. No. 5,392,750, for example, shows in one embodiment an annular filter surrounding a fuel delivery unit (pump) inside a cup-shaped supporting element. Fuel flows axially upward through the pump to an upper cover on an aggregate (housing), and then radially outward and axially downwardly through filter media, and then finally radially outward and axially upward through a raiser conduit to the internal combustion engine.

Other devices for supplying fuel to an engine include Bangs, U.S. Pat. No. 2,781,726; Von Wangenheim, U.S. Pat. No. 2,497,247; Von Wangenheim, U.S. Pat. No. 2,377,299; Niemeyer, et al., U.S. Pat. No. 3,294,025; Baltz, et al., U.S. Pat. No. 5,231,967; and Jaeger, et al., U.S. Pat. No. 5,389,245.

While the above devices appear satisfactory for certain applications, it is believed that these devices can have certain drawbacks. For example, certain of the above devices have filters which are disposed in axially-spaced relation to the pump, which can increase the overall size of the pump housing. Other of these devices do not provide a filter element which is easily accessible, such that a filter element can be quickly and easily removed and replaced when it becomes spent or otherwise unusable. Still further of these devices do not provide a simple arrangement of components which are relatively easy to manufacture and assemble. Certain of the devices also do not provide for filtering the fuel prior to the fuel entering the pump, which can cause deterioration and premature wear of the pump.

As such, it is believed that there is a demand in the industry for a fuel pump assembly which addresses the above drawbacks.

SUMMARY OF THE INVENTION

The present invention provides an improved fuel pump assembly which has a compact size, is simple to manufacture and assemble, and has a filter element which can be easily removed and replaced. In addition, the filter element filters the fuel prior to the fuel entering the pump.

According to the principles of the present invention, the fuel pump assembly includes a filter element disposed in coaxial surrounding relation to a fuel pump. The filter element and fuel pump are disposed within a cylindrical housing or container having a removable cover. The filter element comprises upper and lower end caps and a tubular filter media which is retained between the end caps. The upper end cap of the filter element includes a flat annular end wall with a central opening, and a cylindrical side wall which extends downward axially away from the end wall. The side wall has a continuous, uninterrupted surface extruding down through the filter media which defines an annular pump cavity. The pump is introduced through the opening in the end wall and received within the pump cavity in adjacent surrounding relationship to the side wall. The lower end of the side wall has a radially inward-directed flange which defines an annular lower opening. An annular seal is disposed in the opening in the lower end of the side wall. The seal includes an axially upwardly-extending lip which seals against the lower end of the pump around a pump inlet, and an axially downwardly-extending lip. The upper and lower lips together define a groove which receives the annular flange on the sidewall to retain the seal on the sidewall.

The lower end cap for the filter element also includes a flat annular end wall. An annular spacer collar or ring is formed around the central axis of the lower end cap. The spacer collar has a plurality of spaced-apart tabs which project axially upward from the lower end cap. The tabs contact the lower lip of the seal on the upper end cap. The tabs define flow paths between the spacer collar and the seal for fuel flow to the inlet of the pump and retain the seal on the side wall of the upper end cap.

Radially outwardly-projecting ridges on the upper and lower end caps, and axially downwardly-projecting fins on the lower end cap, provide for properly locating the filter element in the housing and for providing an offset between the exterior of the filter element and the interior walls of the housing for fuel flow therebetween.

Fuel is introduced into the fuel pump assembly through the cover in the pump housing, and flows around the exterior of the filter element and radially inward through the filter media. Impurities such as particulate matter and water in the fuel are separated out by the filter media. The fuel then flows axially downward through the filter media and then radially inward through the flow paths formed between the spacer collar in the lower end cap and the seal in the upper end cap. The fuel then flows axially upward through the opening at the lower end of the side wall and into the fuel inlet opening to the pump. The pump delivers the fuel exteriorly of the fuel pump assembly to an internal combustion engine.

The fuel filter can be easily removed from the housing and replaced by removing the cover from the housing, removing the pump from the cavity in the filter element, and then removing and replacing the filter element. The pump can then be easily introduced into the cavity in a fresh filter element, the pump and filter element can be located within the housing and the cover to the housing can be replaced.

As such, as described above, the present invention provides an improved fuel pump assembly which is compact, simple to manufacture and assemble, and has a filter element for filtering fuel to the pump which can be easily removed and replaced when the element becomes spent or otherwise unusable.

Further features and advantages of the present invention will become apparent upon reviewing the following specification and appended drawings.

DETAILED DESCRIPTION OF THE PREFERRED EMBODIMENT

Figure 1:
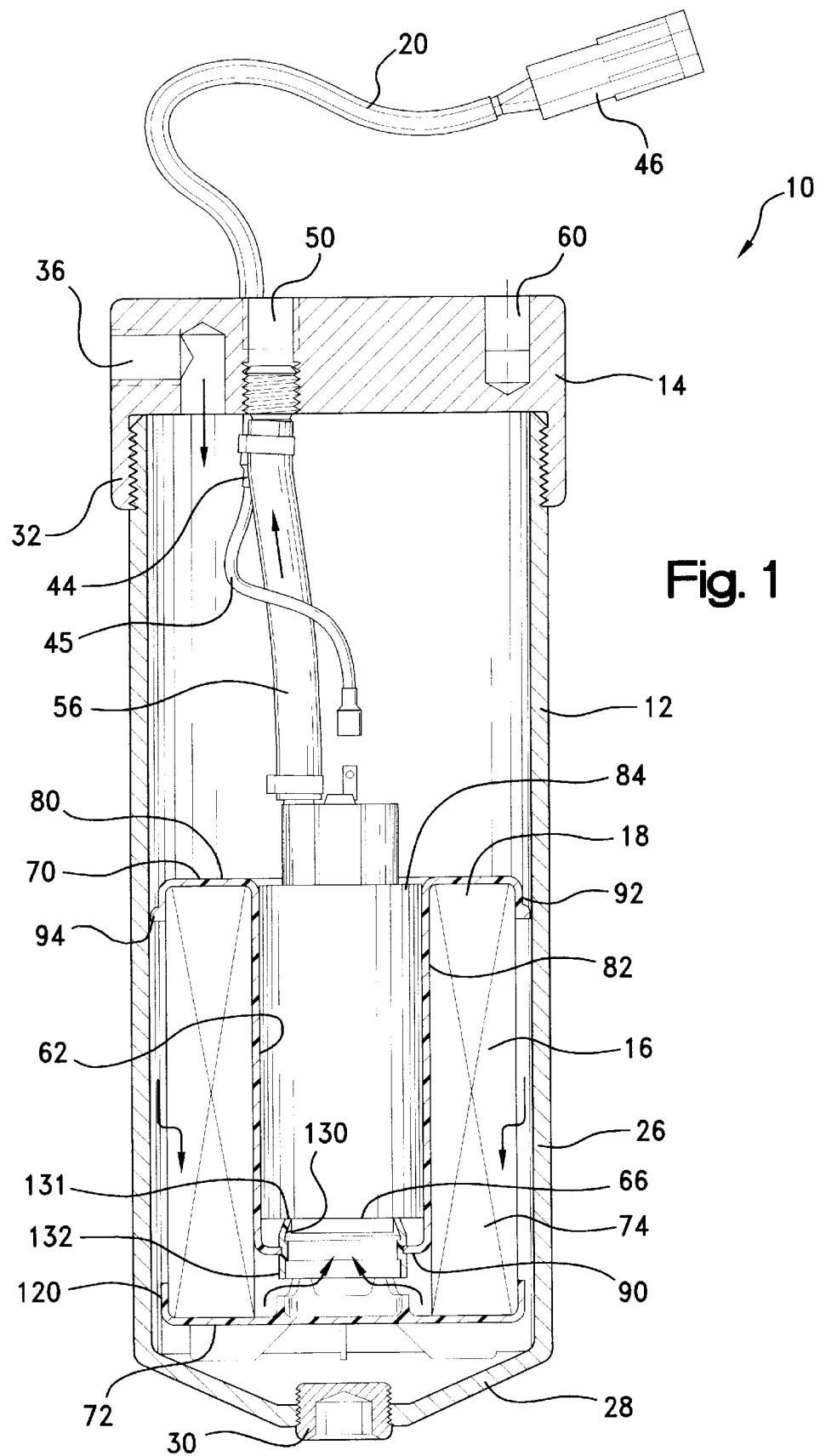
FIG. 1 is a cross-sectional side view of the fuel pump assembly constructed according to the principles of the present invention.
Figure 2:
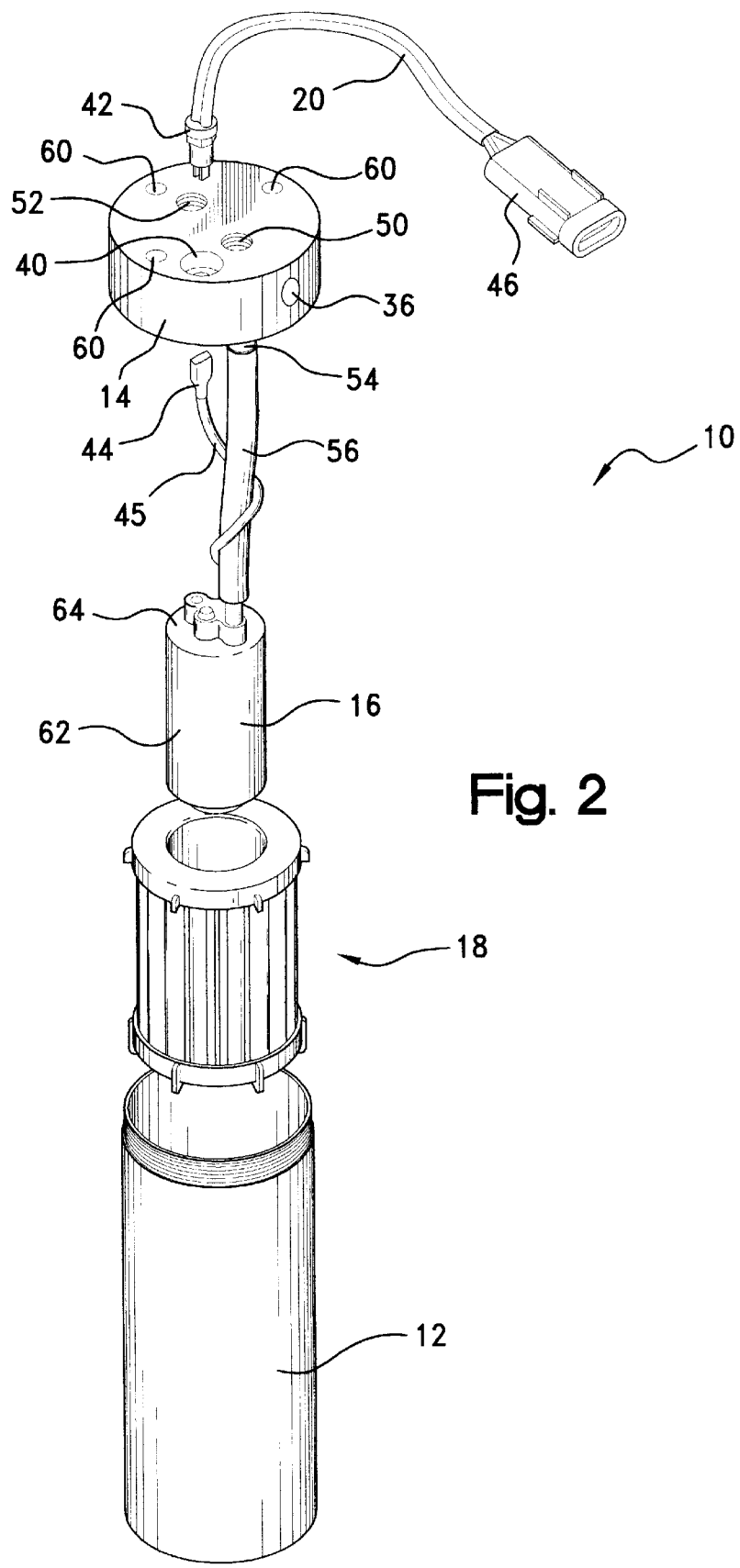
FIG. 2 is a partially assembled perspective view of the various components of the fuel pump assembly of FIG. 1.

Referring to the drawings, and initially to FIGS. 1 and 2, a fuel pump assembly constructed according to the principles of the present invention is indicated generally at 10. The fuel pump assembly comprises an outer container or housing 12 having an upper end cover 14, a fuel pump 16 and a replaceable filter element 18. Pump 16 can be externally connected to appropriate power supplies and controls through external connector 20.

Container 12 preferably has a cylindrical shape with an outer side wall 26 and an integral lower end cap 28. As should be appreciated, the term "upper" and "lower" as used herein are only intended to describe the relative positioning of the components and are not otherwise intended to limit the scope of the present invention. In any case, lower end cap 28 can include a threaded drain plug 30, which can be removed to drain fluid (e.g., water separated from the fuel) from the bottom of container 12. The cover 14 is removable from the container, and to this end, the cover includes a cylindrical sleeve 32 with internal threads which cooperate with external threads on the upper portion of cover 12. Cover 14 further includes a fuel inlet passage 36 which, for example, can include blind end bores defining a flow path radially inward and then axially downward to allow fuel to be directed into container 12, although the flow path could also extend axially downward from the end surface of the cover. In any case, passage 36 can include a threaded opening to allow attachment of conduits from a fuel supply tank or transfer pump.

Cover 14 further includes an axially-extending electrical connection bore 40 which receives the male plug 42 on one end of external connector 20. A corresponding female plug 44 receives male plug 42 and is electrically connected to pump 16 by internal connector 45. Male plug 42 and female plug 44 provide for a fluid-tight electrical connection through cover 14. External connector 20 also includes a female plug 46 for remote attachment to appropriate pump controls and power supply.

Cover 14 also includes a fuel outlet passage 50 formed axially through the cover, and a fuel return passage 52 also formed axially through cover 14. The inside end of fuel outlet passage 50 includes a nipple 54 which receives tubing 56 from the outlet of pump 16. The inside end of fuel return passage 52 is open to the inside of container 12. The outside end of outlet passage 50 and fuel return passage 52 can be threaded so as to be easily connectable within the fuel system. Finally, mounting holes or bores 60 can be provided axially inward into cover 14 for mounting the fuel pump assembly at an appropriate location in the fuel system. Other mounting devices or techniques could also be used.

Container 12 and cover 14 can be formed from conventional material, e.g., aluminum, using conventional metal forming techniques, for example, drawing, stamping or machining, as should be known to those skilled in the art.

The pump 16 for the pump assembly preferably includes an outer cylindrical housing or casing 62, an upper end 64 with appropriate electrical connections and an outlet fuel port, and a flat bottom end 66. The bottom end 66 of pump 16 includes an inlet fuel passage which typically has an annular mouth or opening. Pump 16 is preferably a conventional fuel pump which is commercially available from a variety of manufacturers. One fuel pump appropriate for the present invention is commercially available from Walbro Company of Cuff City, Mich. under the Model/Designation No. 526. The size and capacity of the pump can vary depending on the particular fuel requirements, as should be apparent to those skilled in the art.

Figure 3:
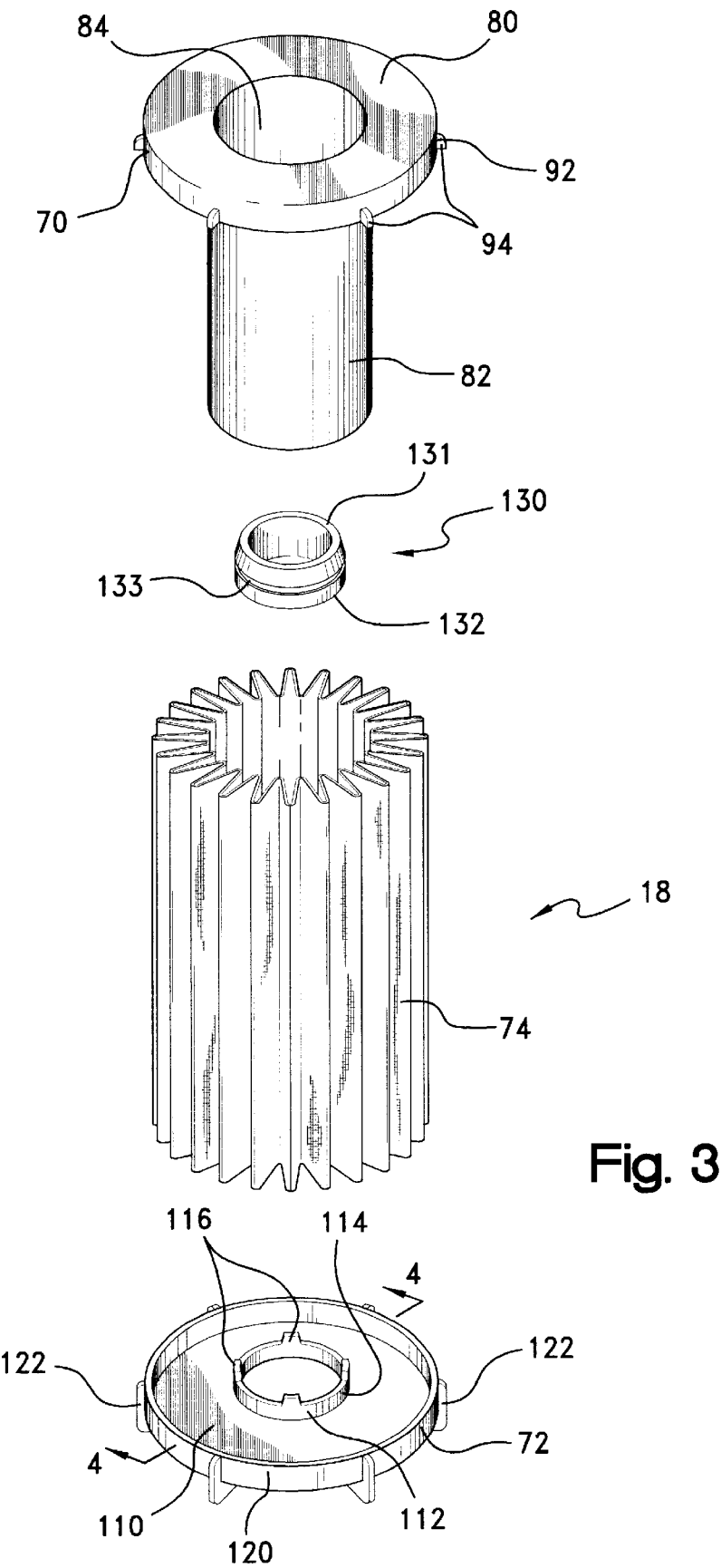
FIG. 3 is a partially assembled perspective view of the filter element for the fuel filter assembly in FIG. 1.

Referring now to FIG. 3, the filter element 18 for the pump assembly includes an upper end cap 70, a lower end cap 72 and filter media 74 which is disposed between the upper end cap and lower end cap. Upper end cap 70 includes a flat, transversely-extending end wall 80 which preferably has the form of an annulus and defines a central opening 84. A cylindrical side wall 82 extends axially downward from end wall 80 around opening 84, and has a continuous uninterrupted surface. Side wall 82 also includes an radially inwardly-projecting flange 90 (FIG. 1) at its lower inner end which defines an annular opening. The opening formed at the lower end of the side wall is preferably slightly larger than the fuel inlet opening at the bottom end of the pump.

An annular flange 92 extends axially downwardly around the periphery of end wall 80. A plurality of axially-extending ridges or spacers 94 are formed at spaced-apart locations around the outer circumference of flange 92. Ridges 94 provide a predetermined amount of offset between end wall 80 and the inner surface of cylinder 26 for fuel flow therebetween, as will be described herein in more detail. Preferably, the upper end cap 70 is formed in one piece from a light weight, inexpensive material, for example plastic, using conventional plastic-forming techniques which should be known to those skilled in the art.

Figure 4:
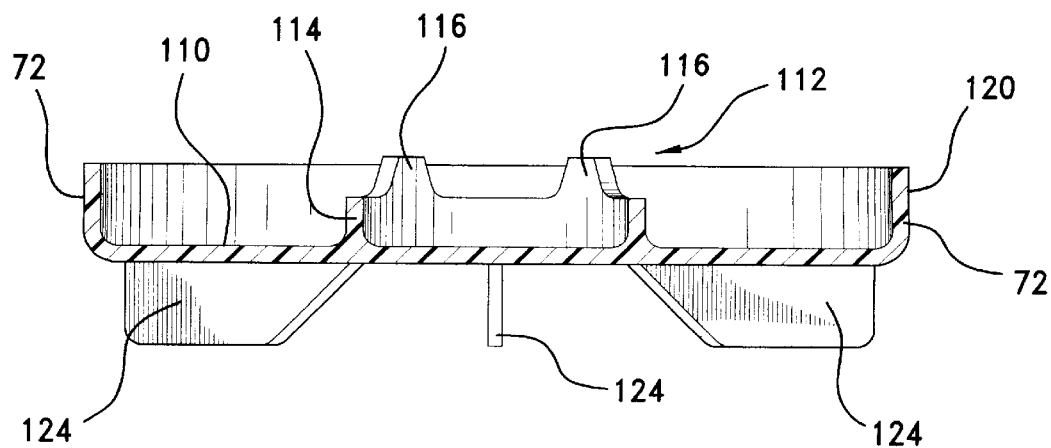
FIG. 4 is a cross-sectional side view of the lower end cap for the filter element taken substantially along the plane described at lines 4—4 of FIG. 3.
Figure 5:
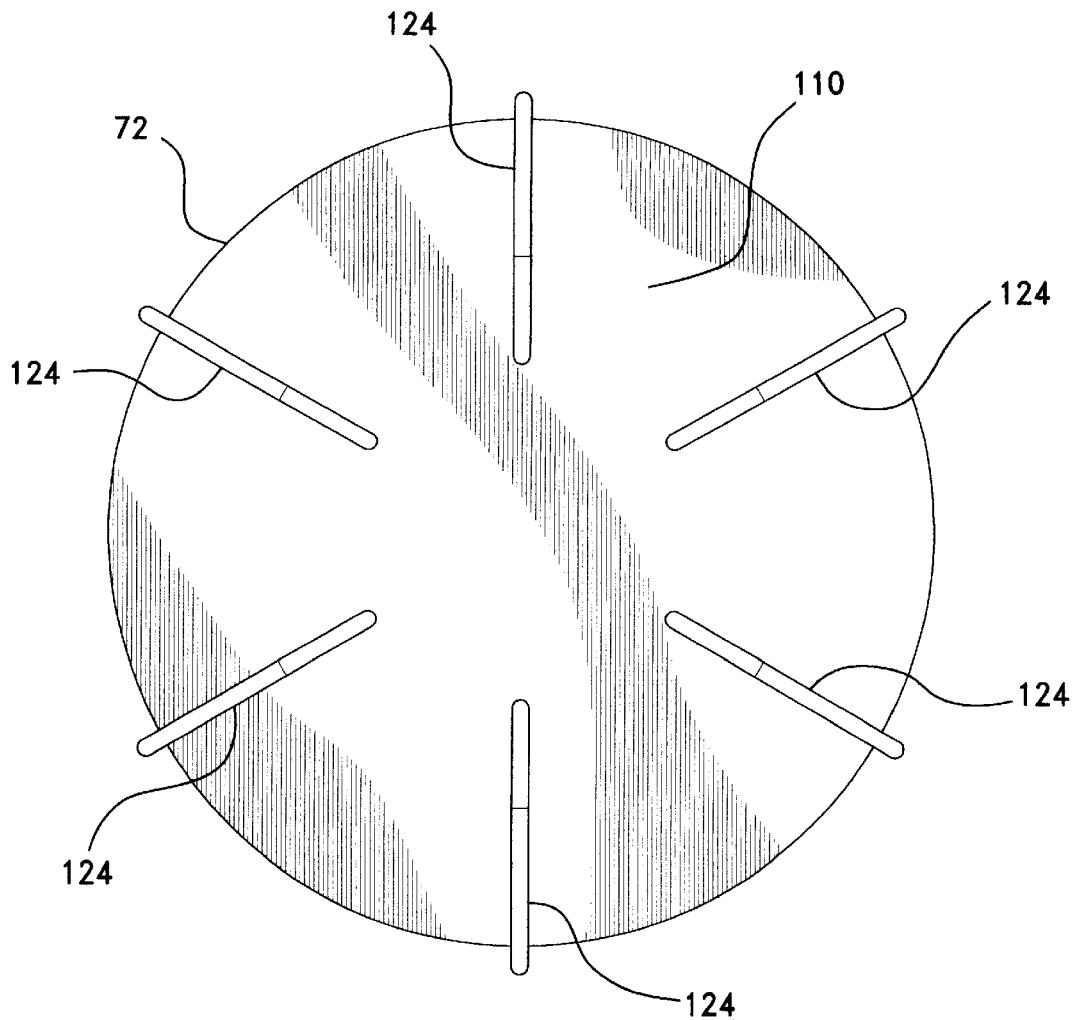
FIG. 5 is a bottom end view of the lower end cap for the filter element of FIG. 3.

Referring now to FIGS. 3–5, the lower end cap 72 for the filter element also includes a flat, transversely-extending annular end wall 100. A spacer element, indicated generally at 112, extends axially upward away from end wall 110. Spacer element 112 comprises an annular ring or collar 114 having a plurality of axially and upwardly-extending tabs or flanges 116. Tabs 116 are preferably formed at equal, spaced-apart locations around the circumference of spacer ring 114. Preferably, there are four tabs on ring 114, however, this can vary depending on the particular application. An annular flange 120 extends axially upwardly around the periphery of end wall 110. A plurality of axially-extending ridges or spacers 122 are formed at equal spaced-apart locations around the outer circumference of flange 120. Ridges 122, like ridges 94 on upper end cap 70, provide a predetermined amount of offset between lower end cap 72 and the inner surface of container side wall 26 for fuel flow therebetween. Finally, a plurality of radially-extending fins 124 project axially downward from end wall 110. Fins 124 are formed integrally with ridges 122 and provide for an axial offset of lower end cap 72 of the filter element from the lower end cap 28 of the container. Fins 124 seat the filter element properly within the container as well as allow fuel to flow under lower end cap 72 such that the fuel (or water separated from the fuel by the filter media) can be drained from the container by removing plug 30 in end cap 28. Lower end cap 72 is also preferably formed in one piece from light weight, inexpensive material, for example plastic, using conventional-plastic forming techniques.

An important aspect of the present invention is the provision of a seal ring, indicated generally at 130 in FIGS. 1 and 3. Seal ring 130 has a configuration which matches the opening defined by inwardly-turned flange 90 at the lower end of side wall 82, that is, the seal ring has an annular configuration. Seal ring 130 is formed from conventional elastomeric or other resilient material and includes a first, axially upwardly projecting annular lip 131 and a second, axially downwardly projecting lip 132. Lip 131 has an inwardly-tapered design, while lip 132 is preferably flat. Upwardly projecting lip 131 and downwardly-projecting lip 132 define an annular groove 133 therebetween. Annular groove 133 is designed to receive the inwardly-extending annular flange 90 on side wall 82 to retain seal 130 on upper end cap 70. The diameter of seal ring 130 is particularly chosen such that axially upwardly-projecting lip 131 contacts and seals against pump 16 when pump device 16 is located within the cavity of upper end cap 70. More specifically, lip 131 seals against the flat end surface 66 of pump 16 around the pump inlet passage. Lip 131 is preferably slightly compressed against pump 16 to provide a fluid-tight seal around the passage. In addition, tabs 116 on spacer ring 114 contact the downwardly-projecting lip 132 on seal 130 and are slightly compressed against this lip. Tabs 116 help to retain seal 130 on side wall 82 of upper end cap 70. As also can be appreciated, the axial length of tabs 116 and lower end cap 72 determine the spacing between end wall 110 and the lower end of cylinder 82 on upper end cap 70.

Referring now to FIGS. 1 and 3, filter media 74 preferably has a tubular configuration which extends between and is retained by upper end cap 70 and lower end cap 72. In particular, filter media 74 has an inner surface which is adjacent to and is supported by the downwardly-extending cylindrical side wall 82 of upper end cap 70, and an outer surface which is bounded by downwardly-extending annular flange 92 on upper end cap 70 and upwardly-extending annular flange 120 on lower end cap 72. An adhesive compound or potting material is applied to the ends of the filter media, or to the inner surface of the upper and lower end walls 80, 110, to adhesively secure the upper and lower end caps to the filter media, and to retain the filter media in its pleated form. Preferably, filter media 74 is a single-ply, axially-pleated filter media. The filter media is preferably treated so as to remove water from fuel passing through the filter media. One type of media appropriate for the present invention is manufactured by the assignee of the present invention under the mark/designation Aqua-bloc. The composition, structure and efficiency of the filter media can be chosen depending upon the particular application, but in any case, the filter media is preferably formed from conventional material and is manufactured using conventional filter media manufacturing techniques.

As should be apparent from the above discussion, seal ring 130 is first assembled with upper end cap 70 such that the groove 133 in seal ring 130 is received in the opening defined by the radially inward-extending annular flange 90 of side wall 82. Next, the potting compound is provided at both ends of filter media 74 (or on the inside surface of the end caps) and the end caps are introduced at opposite ends of the filter media. Side wall 82 extends downwardly through substantially the entire axial length of the filter media 74 such that seal 130 contacts tabs 116 on spacer 112.

Next, the filter element 18 is inserted within container 112, with lower end cap 72 being inserted first, such that fins 124 seat against the end cap 28 of the container. Pump 16 is then inserted within the cavity in upper end cap 70 such that the lower end 66 of pump 16 is seated against ring seal 130. Pump 16 could also be located within the cavity in the upper end cap prior to the filter element being introduced into the container. Seal 130 surrounds the inlet opening to the pump on lower end 66. Outlet tubing 56 is then connected to nipple 54 on cover 14 and male connector 42 is connected to the corresponding female connector 44 to the pump 16. Cover 14 is then attached, e.g., screwed, onto container 12. Typically cover 14 would be fixedly mounted to support structure in the fuel system and to container 12 would therefore be attached to the cover by screwing the container onto the cover. Appropriate connections are then made by external connector 20 to remote controls and power supply for pump 16.

Fuel entering fuel inlet 36 to pump assembly 10 is filtered by filter element 18 and then delivered by pump 16 to an internal combustion engine through outlet passage 50. Specifically, the fuel travels axially downwardly between the upper end cap 70 and the container walls by virtue of the ridges on the upper and lower end caps. Impurities in the fuel such as particulate matter and water are separated from the fuel as the fuel passes radially inward through the filter media and then axially downward toward the lower end cap. Water separated from the fuel can be drained from the container by removing plug 30 in end cap 28. The fuel then flows radially inward and axially upward through the flow paths between the tabs on the ring on the lower end cap and the seal ring, and the fuel then flows upward into the inlet opening to the pump for delivery to the internal combustion engine. Unused fuel can be returned from the engine to the pump assembly via return passage 52. When the filter element 18 becomes used or spent, container 12 can be removed from cover 14, connectors 44 and 42 can be disconnected, outlet tubing 56 can be removed from nipple 54, and pump 16 can be removed from the cavity of filter element 18. Filter element 18 can then be easily removed from the container and replaced. The process is then reversed to install a fresh filter element in the container.

Thus, as described above, the present invention provides an improved fuel pump assembly which is compact, simple to manufacture and assemble, and has a filter element which can be easily replaced when the filter element becomes spent or otherwise unusable.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:

an upper end cap having a transversely-extending annular end wall surrounding a central opening and a sidewall unitary with the end wall and extending downward axially away from said upper wall around said opening, said sidewall having a continuous, uninterrupted cylindrical surface which defines a cavity within said end cap, said sidewall also defining a lower circular opening;

a lower end cap having a transversely-extending, continuous, imperforate circular end wall;

tubular filter media retained between said end wall of said upper end cap and said end wall of said lower end cap, said filter media surrounding said sidewall of said upper end cap; and an annular seal disposed in said lower opening of said sidewall, said seal including a first lip projecting axially upwardly into the cavity defined by said side wall, for sealing against a pump mounted axially and internally to said side wall.

2. The filter element as in claim 1, wherein said lower end cap includes an axially upwardly extending spacer ring having tabs extending between said end wall of said lower end cap and said annular seal, said tabs defining flow paths between said spacer ring and said seal.

3. The filter element as in claim 2, wherein said tabs on said spacer ring are disposed in circumferentially spaced apart relation to each other in an annular configuration on said lower end cap, and extend upwardly to contact said seal.

4. The filter element as in claim 1, wherein said cylindrical side wall of said upper end cap includes a unitary, radially-inwardly extending annular flange at the lower end thereof defining said lower opening, said seal inwardly-bounding and carried by said annular flange.

5. The filter element as in claim 1, wherein said end wall and said sidewall of said upper end cap are formed together in one piece.

6. The filter element as in claim 1, further including outwardly projecting ridges spaced circumferentially around the periphery of said upper end cap, said ridges extending radially outwardly beyond the outer periphery of the upper end.

7. The filter element as in claim 1, wherein at least a portion of said tubular filter media is in surrounding contact with said sidewall of said upper end cap.

8. The filter element as in claim 7, wherein said upper end cap includes a peripheral flange extending circumferentially around the wall of the upper end cap and extending axially downward therefrom, and said lower end cap includes a corresponding peripheral flange extending circumferentially around the end wall of the lower end cap and extending axially upward therefrom, said filter media being retained within the area bounded by said flanges on said upper and lower end caps, and said side wall on the upper end cap.

9. The filter element as in claim 1, wherein said sidewall extends within said tubular filter media substantially the entire axial length of the filter media, and is spaced-apart from the lower end cap.

10. The filter element as in claim 4, wherein said seal also includes a second lip projecting axially downwardly from said seal.

11. The filter element as in claim 10, wherein said first and second axially extending lips on said seal define an annular groove therebetween which receives said radially inwardly extending flange at the lower end of said side wall on said upper end cap to retain said seal on said upper end cap.

12. The filter element as in claim 1, further including axially downwardly extending fins and radially outwardly projecting ridges spaced circumferentially around the lower end cap, said ridges extending radially outwardly beyond the outer periphery of the lower end cap.

13. A replaceable filter element for a pump assembly, comprising:
   and upper end cap having a transversely-extending end wall surrounding a central opening and a sidewall unitary with the end wall of the upper end cap and extending downward axially away from said upper wall around said opening, said sidewall having a continuous, uninterrupted surface to define a pump cavity within said end cap, said sidewall also defining a lower opening;
   a seal disposed in said lower opening of said upper end cap, said seal including a first lip projecting axially upwardly into the pump cavity defined by said sidewall for sealing against a pump in the pump cavity;
   a lower end cap having a transversely-extending end wall, said lower end cap having axially upwardly-extending spacer tabs extending between said end wall of said lower end cap and said seal for defining a flow path between said lower end cap and said seal to said pump cavity in said upper end cap; and
   filter media retained between said end wall of said upper end cap and said end wall of said lower end cap, said sidewall of said upper end cap extending downwardly through said filter media proximate a lower end of said filter media.

14. The replaceable filter element as in claim 13, wherein said seal includes a second lip projecting axially downwardly, said spacer tabs extending axially upward to contact said second lip of said seal.

15. A pump assembly, comprising:
   a container with a removable cover, and a filter element and a pump enclosed within said container, said filter element having an upper end cap with a transversely-extending annular end wall surrounding a central opening and a cylindrical sidewall unitary with the annular end wall and extending downward axially away from said end wall, said side wall having a continuous, uninterrupted cylindrical surface which defines a pump cavity within said end cap, said sidewall also defining a lower circular opening;
   a lower end cap having a transversely-extending circular end wall;
   tubular filter media retained between said end wall of said upper end cap and said end wall of said lower end cap;
   an annular seal disposed in said lower opening of said upper end cap, said seal including a first lip projecting axially upwardly into the cavity defined by said sidewall; and
   said pump being disposed within said pump cavity in co-axial relation to said filter element, said pump having a cylindrical outer surface in surrounding contact with said sidewall of said upper end cap, and said pump including an inlet end in engagement with said annular seal, said annular seal sealing around an inlet opening in said inlet end of said pump.

16. The pump assembly as in claim 15, wherein said lower end cap includes an axially upwardly extending spacer ring having circumferentially-spaced tabs extending between said annular wall of said lower end cap and said annular seal for retaining said seal on said cylindrical wall of said upper end cap and for defining flow paths between said spacer ring.

17. A method for filtering fuel prior to the fuel being introduced into a pump, comprising the steps of:
   providing a filter element having an upper end cap with a transversely-extending annular end wall surrounding a central opening and a cylindrical sidewall unitary with the end wall of the upper end cap extending downward axially away from said upper wall around said opening, said sidewall having a continuous uninterrupted cylindrical surface which defines a cavity within said end cap, said sidewall also defining a lower circular opening; a lower end cap having a transversely-extending circular end wall and circumferentially-spaced spacer tabs extending axially upward from said lower end cap; tubular filter media retained between said end wall of said upper end cap and said end wall of said lower end cap; and an annular seal disposed in said lower opening of said upper end cap in contact with said tabs to define flow paths between said tabs and said seal, and
   directing fuel radially inward through the tubular filter media and then axially downward through the filter media, radially inward through the flow paths between the tabs on the lower end cap and the seal, and then axially upward through the lower opening in the sidewall of the upper end cap, providing a cylindrical pump, introducing the pump axially into the cavity in the filter element, such that the seal in the lower opening of the side wall seats against the pump around a fuel inlet to the pump, and directing fuel axially upward through the lower opening in the sidewall of the upper end cap into the fuel inlet in the pump.

18. The filter element as in claim 1, wherein a flow path is defined between the seal and the lower end cap.

19. The filter as in claim 18, wherein the lower end cap and upper end cap are in supporting cooperation with one another.

20. The filter element as in claim 19, wherein said lower end cap directly engages the annular seal.

21. A filter element, comprising:

a tubular filter media, a first end cap at one end of said tubular filter media and a second end cap at another end of said tubular filter media, said first end cap having a transversely-extending annular end wall surrounding a central opening, said annular end wall of said first end cap being adhesively attached to said one end of said media, said first end cap also having a sidewall unitary with the annular end wall and surrounding the opening, said sidewall extending axially away from said annular end wall of the first end cap within the filter media toward the second end cap, said sidewall having an imperforate cylindrical surface defining an inner cavity, said sidewall also having a distal end between said first and second end caps defining an opening;

said second end cap having a circular, transversely-extending, imperforate end wall, said end wall of said second end cap being adhesively attached to the other end of said media; and an annular seal carried by the sidewall of the first end cap and bounding said opening of said sidewall, said seal including a first lip projecting axially toward the first end cap, and said annular seal and said second end cap defining a flow path therebetween, said seal for sealing against a pump mounted axially and internally to said side wall.

22. The filter element as in claim 21, wherein said second end cap is in supporting cooperation with said first end cap.

23. The filter element as in claim 22, wherein said second end cap directly engages the annular seal.

24. The filter element as in claim 23, wherein said second end cap includes a spacer ring extending between the annular end wall of the second end cap and the annular seal, said spacer ring having circumferentially-spaced tabs defining a plurality of flow paths between said spacer ring and said seal.

25. The filter element as in claim 21, wherein said cylindrical side wall of said first end cap includes a radially-inwardly extending annular flange unitary with the sidewall at the distal end thereof defining a circular opening, said seal inwardly-bounding and carried by said annular flange.

26. A pump assembly, comprising:

a container with a removable cover, and a filter element and a pump enclosed within said container, said filter element having tubular filter media circumscribing a central axis, a first end cap with a transversely-extending annular end wall surrounding a central opening, said first annular end wall adhesively attached to one end of said tubular filter media, a second end cap with a transversely extending imperforate circular end wall adhesively attached to another end of said tubular filter media, and a cylindrical sidewall unitary with the annular end wall and bounding the opening in the first annular end wall, said sidewall extending axially away from the first end wall toward the second end wall and surrounded by the tubular filter media, said side wall having a continuous, imperforate cylindrical surface which defines a pump cavity within said end cap, said sidewall also having a distal end between said first and second end caps defining an opening; and an annular seal carried by the sidewall and having a portion projecting radially inward from the sidewall toward the central axis of the filter element;

said pump being disposed within said pump cavity and surrounded by said sidewall of said first end cap in co-axial relation to said filter element, and said annular seal in engagement with said pump and providing a fluid-tight seal with said pump, and a flow path defined between said second end cap and said annular seal.

\* \* \* \* \*